May 5, 1925.  1,536,700
F. F. BRUCKER
METHOD OF MAKING HOLLOW RUBBER ARTICLES
Filed June 19, 1924
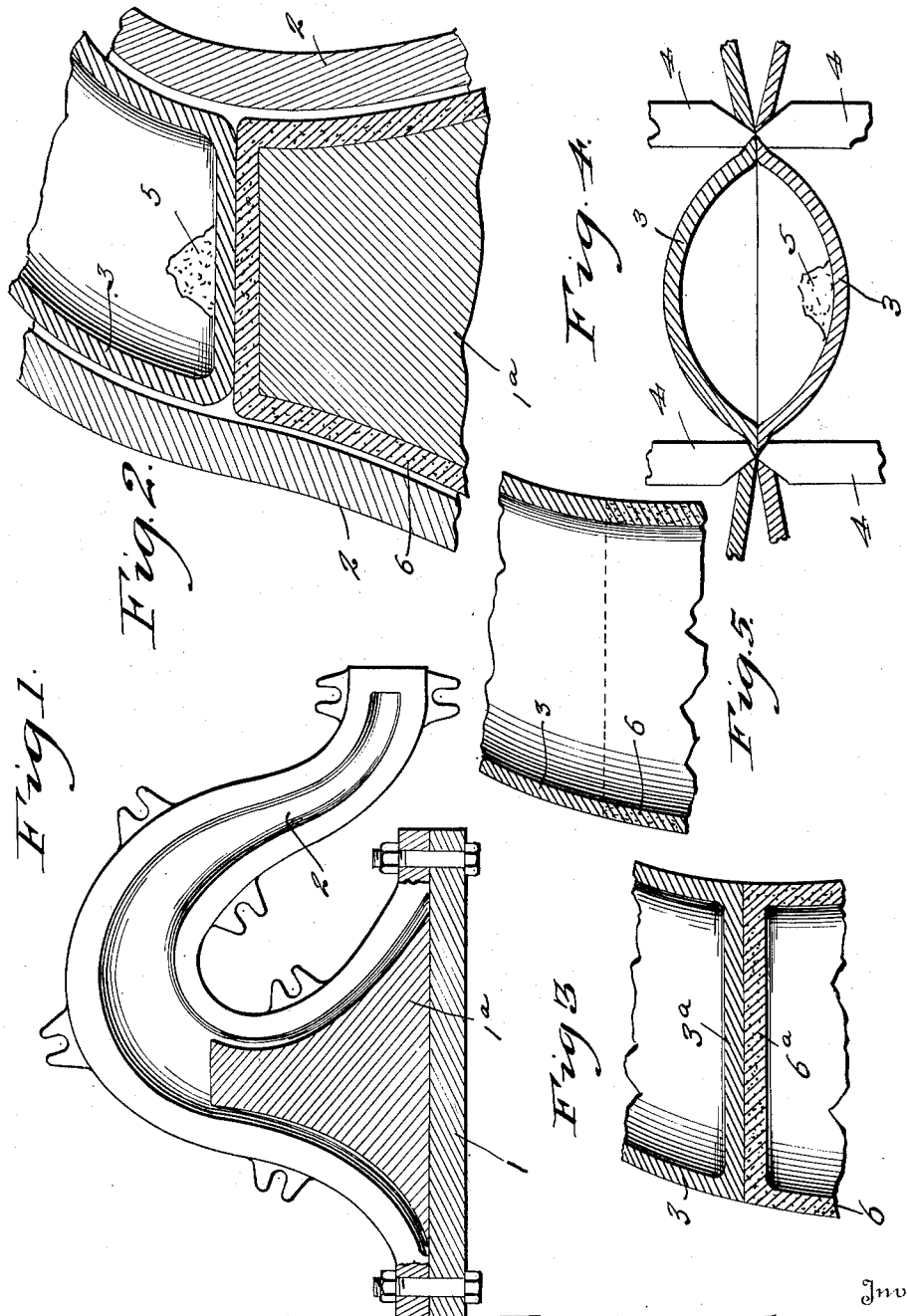
Inventor
Ferdinand F. Brucker Patented May 5, 1925.

1,536,700

UNITED STATES PATENT OFFICE.

FERDINAND F. BRUCKER, OF AKRON, OHIO, ASSIGNOR TO THE MILLER RUBBER COMPANY, OF AKRON, OHIO, A CORPORATION OF OHIO.

METHOD OF MAKING HOLLOW RUBBER ARTICLES.

Application filed June 19, 1924. Serial No. 721,092.

*To all whom it may concern:*

Be it known that I, FERDINAND F. BRUCKER, a citizen of the United States, and resident of Akron, in the county of Summit and State of Ohio, have invented certain new and useful Improvements in Methods of Making Hollow Rubber Articles, of which the following is a specification.

My present invention relates to the manufacture of hollow rubber articles and particularly to the manufacture of sinuous tubular hard rubber articles such as sound conducting horns.

Very successful horns for this purpose have been manufactured from cellular hard rubber. The mold cavities are partially filled with unvulcanized rubber compound suitable for the manufacture of cellular hard rubber, the molds are bolted, and subjected to vulcanizing temperature, preferably in an open steam vulcanizer. During vulcanization the rubber compound expands and completely fills the mold becoming vulcanized in that condition. It has been found impossible to make certain shapes of horns by this process, as cores were required in the molding process and due to the sinuous nature of these horns, such cores could not be removed therefrom.

One object of this invention is to provide a method whereby a horn of sinuous character may be made of hard rubber without the use of sinuous cores. In the method described a horn is produced having the bell portion composed of cellular hard rubber and the sinuous neck portion of solid hard rubber. The horn is so made that the bell portion is molded over a core whereas the sinuous portion is blown from solid hard rubber. The invention includes the novel method hereinafter described as defined by the appended claims.

In the accompanying drawings in which a horn is used as an example of the articles to be produced.

Figure 1 is a longitudinal cross sectional view of a mold such as used in my process.

Fig. 2 is an enlarged cross sectional view of the same with the unvulcanized horn therein, only that portion near the end of the core being shown.

Fig. 3 is a similar view of the horn after vulcanization.

Fig. 3ª is a like view after the trimming, the section lines being such as to indicate the homogeneous nature of the finished article, the junction line being indicated by a dotted line.

Fig. 4 is a cross sectional view of the biscuit for the sinuous portion being formed and cut by a pair of dies.

Fig. 5 is a sectional view of the juncture after cutting out the partition.

Referring to the drawings, in which like numerals indicate like parts, the mold used to produce an article of this nature should completely surround the article and may be made in a number of pieces, an end member 1, and two separable side members 2, 2, to facilitate removal of the object manufactured. One part of the mold, 1, carries a core 1ª, which extends only to such an extent into the object that it may be removed therefrom without difficulty. No core is provided for the remainder of the mold.

The article may be formed from two or more pieces or sheets of rubber seamed together by the action of blunt cutting dies 4, with a material therebetween which will generate gas or vapor at the temperature of vulcanization and by creating pressure within the article, expand it to meet the mold walls. Water and ammonium carbonate may be used for this purpose, as indicated at 5. In making up an article to be blown, two sheets of rubber may be cut and seamed together by dies 3, as shown in Fig. 4, which provides a very cheap means for forming the "biscuit", as the uncured closed article is termed. The dies are made to correspond in shape with the article so that thinning of the walls in expanding will be uniform.

I utilize this method of blowing to produce the sinuous part of the horn or other article in the following manner. A blower-containing biscuit having the approximate shape of the sinuous part of the article, either by the use of dies as illustrated, or by cutting and seaming the pieces by hand, having been produced, I place this biscuit in the mold shown in Fig. 1, the core 1ª of which I have previously covered with unvulcanized hard sponge rubber compound 6. Preferably, I stick the end of the biscuit to the sponge rubber before closing the mold; the sponge rubber may extend completely across the core end as shown in Fig. 2.

After closing the mold the same is placed in an open steam heater and subjected to vulcanization. The sponge rubber stock will expand and fill the bell portion of the mold and simultaneously the blower contained within the biscuit will expand which will cause it to fill the sinuous part of the mold in which position the two compounds will be vulcanized and also homogeneously joined together.

After vulcanization the article may be readily removed from the mold and will have a partition 3ª—6ª where the two stocks join, as well as one at the extreme small end of the article. These may be removed by machining; for instance the first mentioned partition may be removed by a cylindrical saw such as is used to cut buttons from shells so as to make the article at the line of junction of the appearance shown in Fig. 4, and the small end may be either sawed off or drilled out.

A horn produced by this method will have a strong neck portion which need not have a perfectly uniform interior surface as it is not in sight, and furthermore does not play as important a part in the sound amplification as does the bell mouth, whereas all those parts of the horn in sight will have a molded finish. Also the bell portion of the horn will not have as much weight, and will give a more pleasing tone than if made of solid hard rubber.

The principal advantage of my process is that I can produce shapes from which it would be impossible to remove a core and while in the mold illustrated the neck portion is such a part as to be difficult if not impossible to remove a core from, it is conceivable that other horns or other articles might be so designed that a combination of the cellular sponge rubber and blowing processes as described could be used to produce them and I do not wish to confine myself to the manufacture of horns only.

Having thus described my invention, what I claim is:—

1. The hereindescribed method of making a rubber article, which consists in confining unvulcanized rubber between a mold and a core which does not fill the entire mold cavity, and other unvulcanized rubber in the part of the mold cavity not occupied by the core in the shape of a hollow biscuit containing a material which will be gasified by heat, and thereafter subjecting the mold to vulcanizing temperature.

2. The hereindescribed method of making a rubber article which consists in confining rubber compound having a blower incorporated therein between a mold and core occupying but a part of the mold cavity, and other rubber compound in the remaining part of the mold cavity which latter compound is in the shape of a hollow biscuit having a blower material in its hollow interior, and thereafter subjecting the same to vulcanizing temperature.

3. The hereindescribed method of making a rubber article which consists in shaping a batch of rubber compound to sheet form, confining the sheet between a core and a mold which as a cavity portion projected beyond the core, placing in said cavity other rubber compound in the shape of a hollow biscuit having a blower in the interior thereof, and subjecting the same to vulcanizing temperature.

4. The hereindescribed method of making a rubber article which consists in shaping a batch of rubber compound having a blower incorporated therein to sheet form, confining the sheet between a core and a mold which has a cavity portion projected beyond the core, placing in said cavity other rubber compound in the shape of a hollow biscuit having a blower in the interior thereof, and subjecting the same to vulcanizing temperature.

5. The hereindescribed method of making horns and amplifiers which consists in placing rubber compound in sheet form in the mouth portion of a mold having a cooperating core occupying said mouth portion only, and placing in the neck portion of said mold a rubber compound in the shape of a hollow biscuit having a blower in its interior, and subjecting the same to vulcanizing temperature.

In testimony whereof, I affix my signature.

FERDINAND F. BRUCKER.